United States Patent [19]

Galbreath

[11] Patent Number: 4,986,719
[45] Date of Patent: Jan. 22, 1991

[54] ROLL-OFF HOIST FOR VARIABLE POSITIONING OF CONTAINERS

[75] Inventor: Donald E. Galbreath, Winamac, Ind.

[73] Assignee: Galbreath Incorporated, Winamac, Ind.

[21] Appl. No.: 512,128

[22] Filed: Apr. 20, 1990

Related U.S. Application Data

[60] Division of Ser. No. 303,570, Jan. 27, 1989, Pat. No. 4,934,898, which is a division of Ser. No. 896,759, Aug. 14, 1986, Pat. No. 4,840,532, which is a continuation-in-part of Ser. No. 835,186, Mar. 3, 1986, abandoned.

[51] Int. Cl.$^5$ .................... B65G 67/02; B60P 1/28
[52] U.S. Cl. .................... 414/478; 414/480; 414/494; 414/500; 280/405.1
[58] Field of Search ............... 414/477, 478, 479, 480, 414/494, 500, 506, 559; 280/405.1, 406.1, 407, 407.1, 408

[56] References Cited

U.S. PATENT DOCUMENTS

| | | | |
|---|---|---|---|
| 2,703,658 | 3/1955 | Bazzell | 414/480 |
| 3,043,458 | 7/1962 | Klosek et al. | 414/478 |
| 3,485,400 | 12/1969 | Pewthers | 414/477 |
| 3,606,059 | 9/1971 | Haberle, Jr. | 414/478 |
| 3,856,168 | 12/1974 | Mauck | 414/478 |
| 3,893,710 | 7/1975 | Madura | 280/407 |
| 3,964,626 | 6/1976 | Arregui | 414/480 |
| 4,133,439 | 1/1979 | Guranson | 414/494 |
| 4,225,280 | 9/1980 | Brunet et al. | 414/479 |
| 4,455,118 | 6/1984 | Scharf | 414/494 |
| 4,529,349 | 7/1985 | Lutz | 414/421 X |
| 4,580,805 | 4/1986 | Bertolini | 280/407.1 |
| 4,630,991 | 12/1986 | Landoll et al. | 414/478 |
| 4,645,405 | 2/1987 | Cambiano | 414/494 |
| 4,702,662 | 10/1987 | Marlett | 414/477 |
| 4,704,063 | 11/1987 | Updike, Jr. et al. | 414/500 |

FOREIGN PATENT DOCUMENTS

| | | | |
|---|---|---|---|
| 3136700 | 3/1983 | Fed. Rep. of Germany | 414/494 |
| 3206805 | 9/1983 | Fed. Rep. of Germany | 414/494 |

Primary Examiner—Robert J. Spar
Assistant Examiner—Robert S. Katz
Attorney, Agent, or Firm—Woodard, Emhardt, Naughton, Moriarty & McNett

[57] ABSTRACT

A vehicle mounted roll-off hoist having a main hoist frame pivotally mounted at its rearward end to a vehicle such as a semi-trailer or truck, and including a pair of hydraulic lift actuators adapted to move the main hoist frame between a horizontal position and a rearwardly inclined position. A hydraulic actuator apparatus is provided for pulling a container onto the main frame of the hoist or setting off the container from the hoist. An extensible and retractable stop carriage is slidably connected to the forward end portion of the hoist main frame. Hydraulic actuator and locking elements are associated with the stop carriage for placing the container in the optimum position for transport on the vehicle. The hoist is capable of handling containers of both the outside rail and the inside rail type.

3 Claims, 6 Drawing Sheets

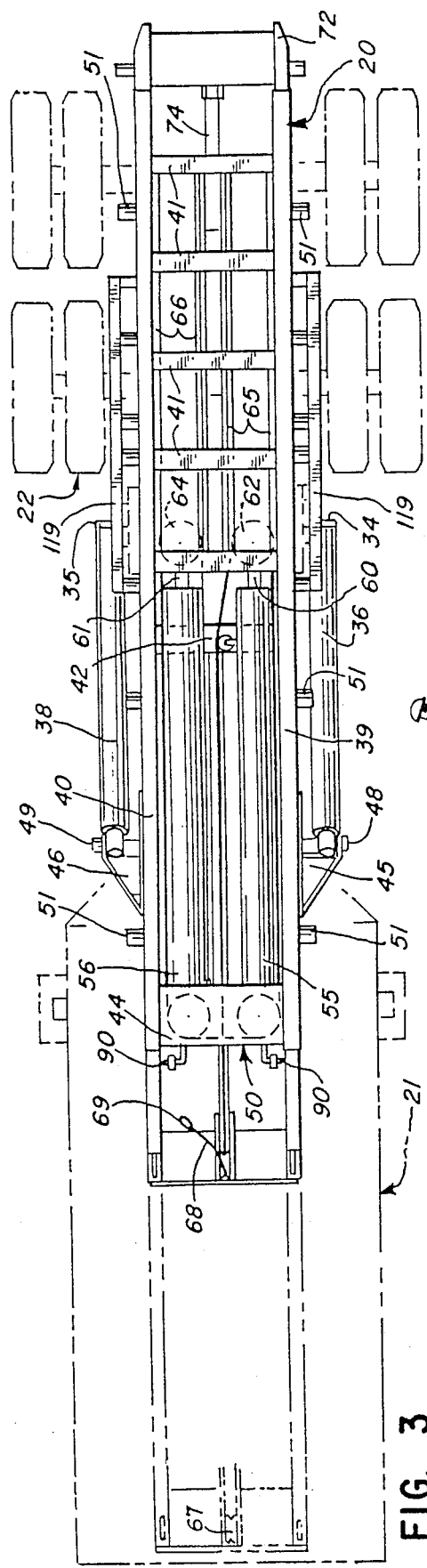
FIG. 3
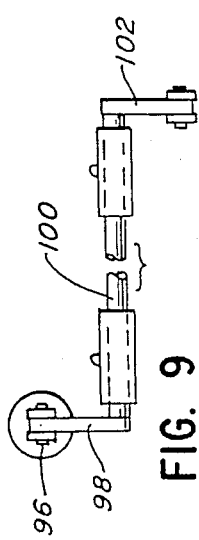
FIG. 9
FIG. 10
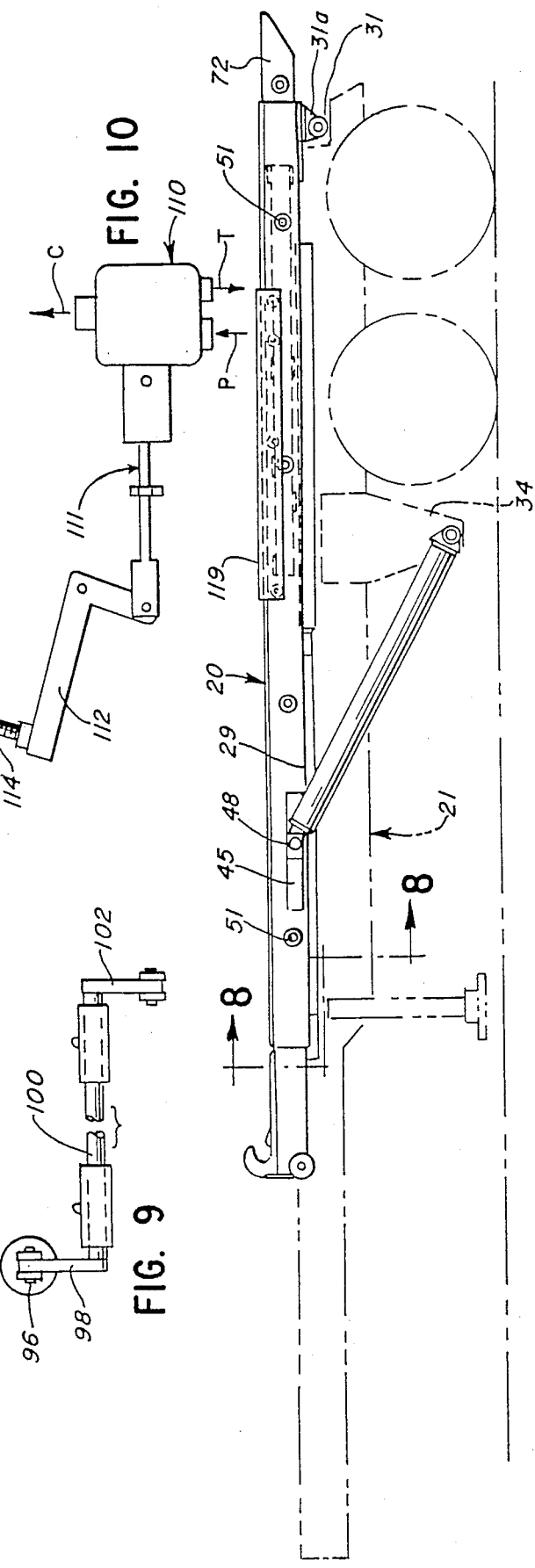
FIG. 4

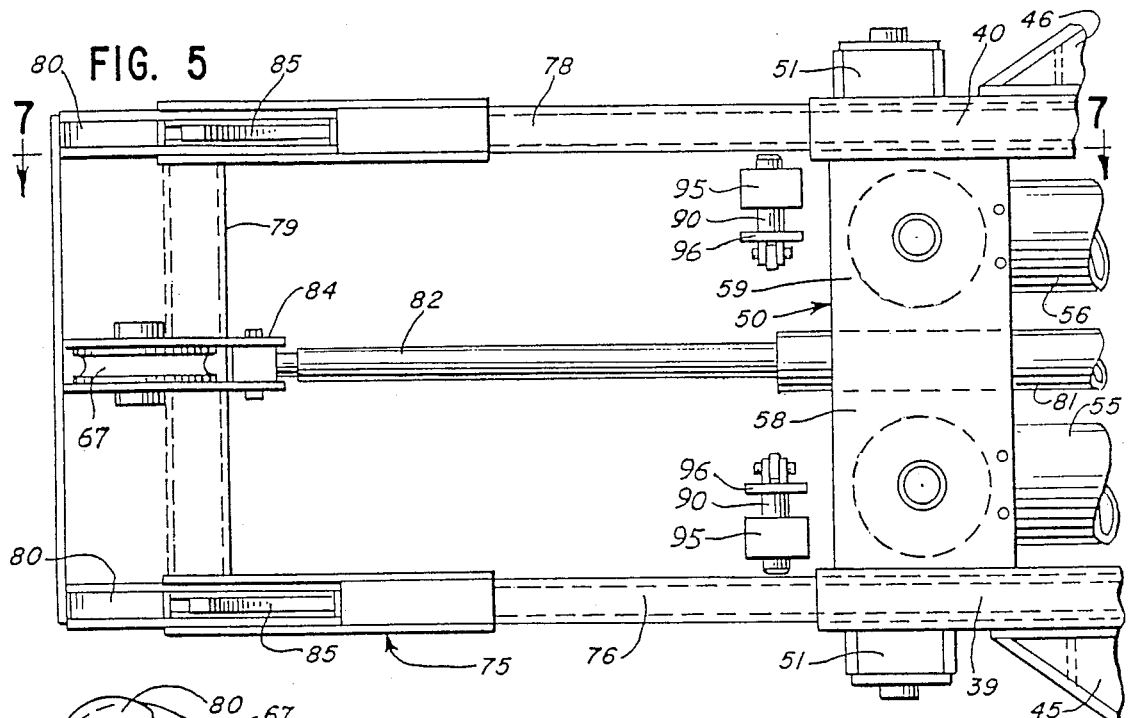
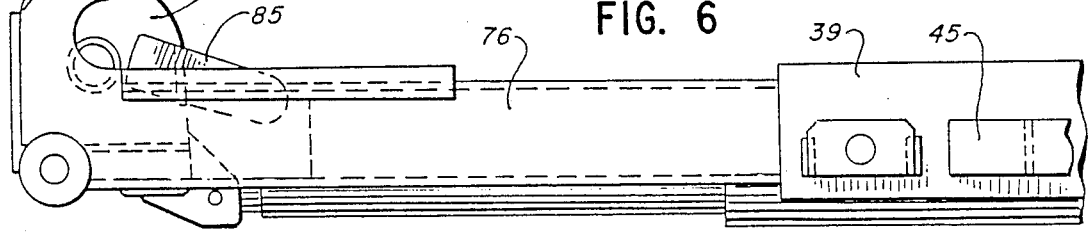
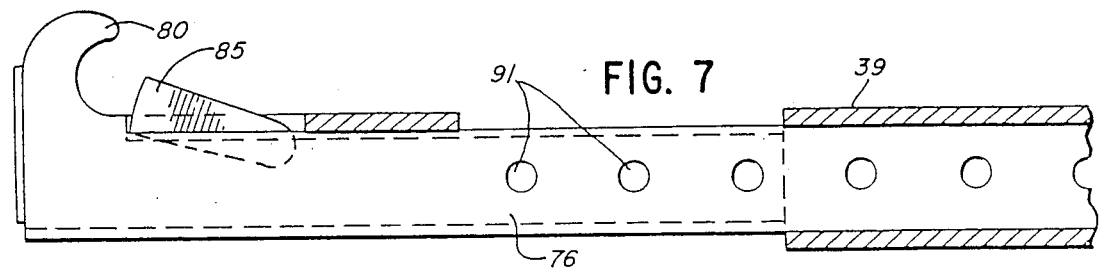
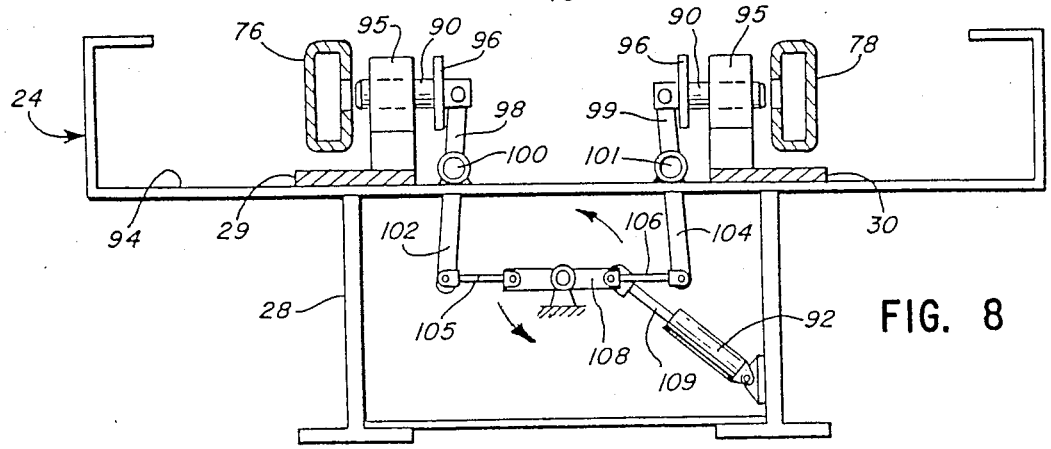

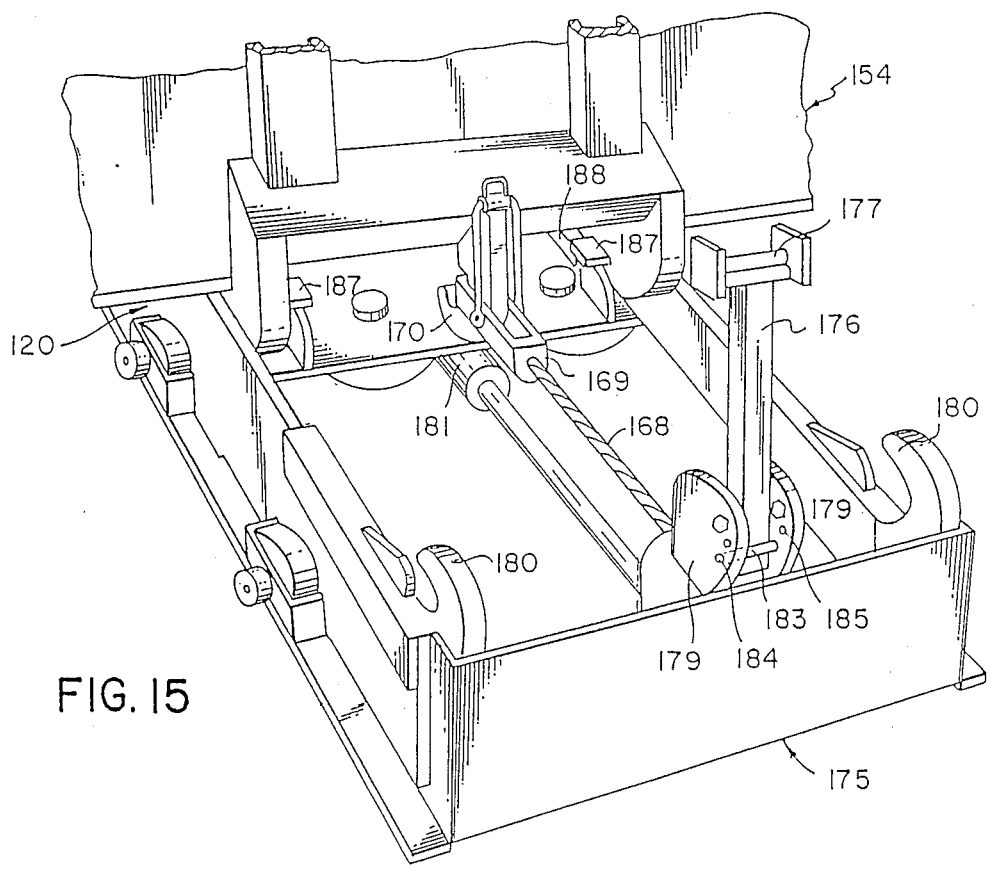
FIG. 15
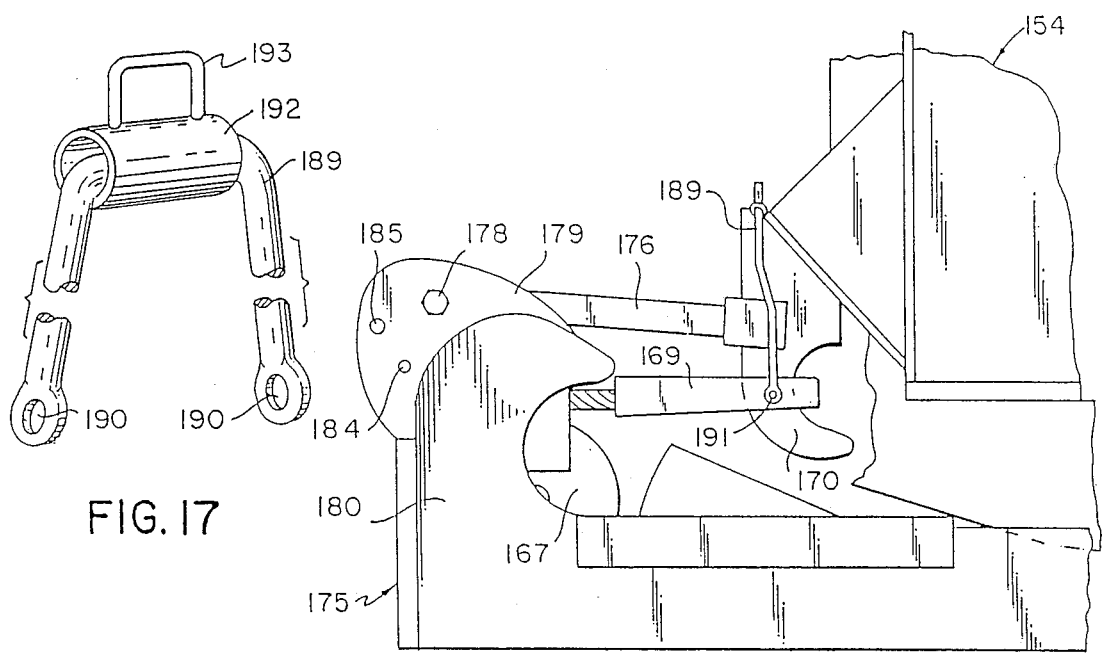
FIG. 17
FIG. 16

ROLL-OFF HOIST FOR VARIABLE POSITIONING OF CONTAINERS

REFERENCE TO RELATED APPLICATIONS

This application is a division of U.S. patent application Ser. No. 303,570, filed on Jan. 27, 1989, now U.S. Pat. No. 4,934,898 which is a division of U.S. patent application Ser. No. 896,759, filed on Aug. 14, 1986, now U.S. Pat. No. 4,840,532, which is a continuation-in-part of U.S. patent application Ser. No. 835,186, filed Mar. 3, 1986, now abandoned.

BACKGROUND OF THE INVENTION

The present invention relates in general to the field of transportable containers for a great variety of materials including solid and liquid waste products. The invention finds Particular, but not exclusive, utility in containers of the type adapted to be picked up and set off by a transport vehicle such as a truck or trailer with a suitable power lift device known as a "roll-off hoist".

Containers for freight, bulk materials, and other products come in numerous sizes and load capacities. It has been a common practice heretofore to pull each container, regardless of its size and loading, aboard the transport vehicle with its forward end abutting a fixed stop on the vehicle. With such a system, the center of gravity of the container may often be located in an unfavorable position on the transport vehicle, imposing unnecessarily high loading upon a weaker area of the vehicle frame and imparting unnecessarily heavy loading to the power lift of the hoist during a roll-off operation.

SUMMARY OF THE INVENTION

In general, a roll-off hoist is provided which permits the loading of a roll-off container in a more favorable position upon the vehicle for transport.

A roll-off hoist has a main hoist frame pivotally mounted at the rearward end of a transport vehicle such as a semi-trailer or truck; a pair of hydraulic lift actuators adapted to move the hoist frame between a horizontal position and a rearwardly inclined position; a cable winch apparatus for lifting a container onto the hoist frame or for unloading a container from the hoist frame; a telescopically extensible and retractable stop carriage slidably mounted to the forward end portion of the hoist frame, and a hydraulic actuator apparatus for placing the stop carriage and the container locked thereto in the optimum position for transport on the hoist frame.

It is an object of the present invention to provide an improved roll-off hoist for use with a semi-trailer or truck which is adapted to place a roll-off container in the most favorable position on the vehicle frame for transport.

Further objects and advantages of the present invention will become apparent from the following description of the preferred embodiment.

BRIEF DESCRIPTION OF THE DRAWINGS

FIG. 3 is a plan view of a roll-off hoist such as shown in FIG. 1, including a dot dash outline of the trailer.

FIG. 4 is a side elevational view of the roll-off hoist shown in FIG. 3, with the trailer indicated in dot dash outline.

FIG. 5 is an enlarged, fragmentary plan view of the stop carriage in the hoist of FIG. 1.

FIG. 6 is an enlarged, fragmentary side elevational view of the stop carriage shown in FIG. 5.

FIG. 7 is an enlarged, fragmentary elevational view showing the inside face of the right hand stop carriage beam, taken in the plane of the line 7—7 in FIG. 5.

FIG. 8 is an enlarged, fragmentary transverse sectional view taken through the stop carriage and the trailer in the plane of the broken section line 8—8 in FIG. 4.

FIG. 9 is a detail view illustrating the connecting shaft between the shot pin levers and the actuating means shown in FIG. 8.

FIG. 10 is a detail view of an interlock mechanism which precludes extension of the stop carriage when the roll-off hoist is not in its horizontal position.

FIG. 15 is an enlarged, fragmentary front perspective view showing the stop carriage of another roll-off hoist also exemplifying the present invention, along with the forward end portion of a container being loaded thereon.

FIG. 16 is a further enlarged, fragmentary elevational view of the hoist stop carriage and container shown in FIG. 15.

FIG. 17 is an enlarged perspective view of the resilient retainer strap which prevents the cable eye from slipping off the container hook.

DESCRIPTION OF THE PREFERRED EMBODIMENT

Figure 1:
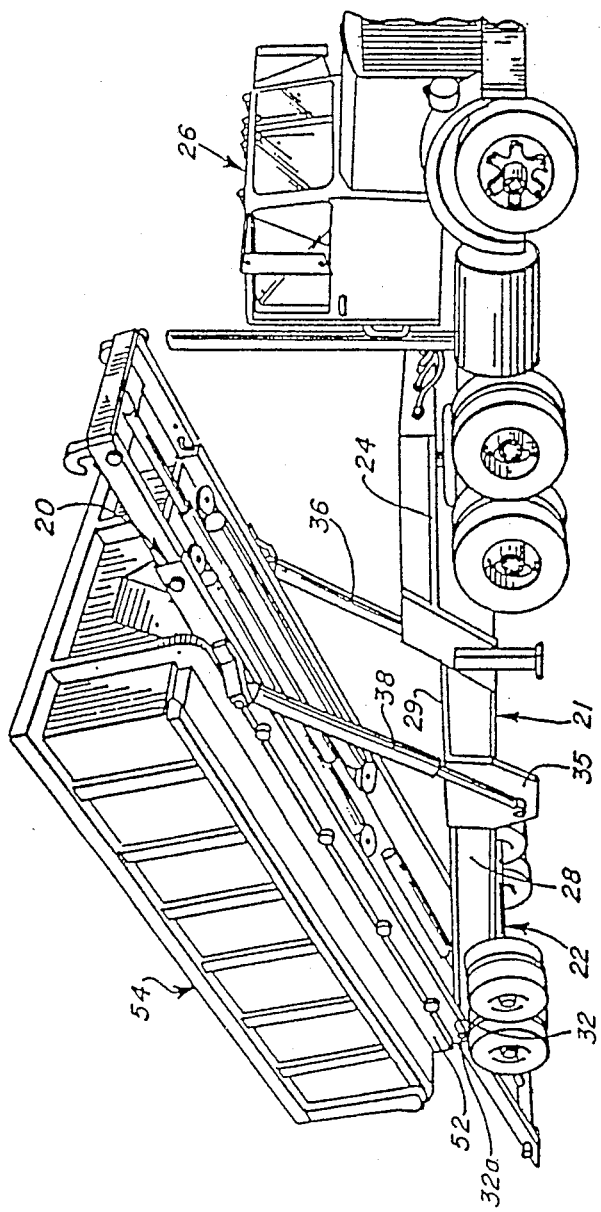
FIG. 1 is a right front perspective view of a roll-off hoist trailer exemplifying the present invention in the process of loading a container.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more specifically to the drawings, the invention is there exemplified in a heavy duty roll-off hoist 20 designed for mounting upon a vehicle such as a semi-trailer 21. Trailer 21 in this instance happens to be of conventional form with a tandem axle wheeled suspension 22 adjacent its rearward end and a gooseneck 24 adjacent its forward end. The gooseneck is provided with the usual kingpin 25 (FIG. 14) for connection to a tandem axle tractor 26. The trailer frame 28 is fashioned as a long box-like weldment defining on its upper surface a pair of laterally spaced, sills 29, 30 (FIG. 8) extending from its rearward end onto the gooseneck 24. Sills 29, 30 are coplanar with each other and substantially coplanar with the top of the gooseneck platform, together defining a support bed for the roll-off hoist 20.

To accommodate roll-off hoist 20, trailer frame 28 includes a pair of hinge elements 31, 32 each located in a recess to the rear of a respective one of sills 29, 30. Trailer frame 28 also includes a pair of laterally spaced, depending thrust brackets 34, 35 situated a short distance to the rear of gooseneck 24 and which serve as pivot supports for the lower ends of hydraulic lift actuators 36, 38 of the hoist.

Roll-off hoist 20 in this instance comprises a pair of spaced apart longitudinal beams 39, 40 of hollow, generally rectangular cross section secured together by cross members 41, cylinder support member 42, and intermediate sheave frame 44. Upper lift brackets 45, 46 are mounted on the outboard sides of longitudinal beams 39, 40 adjacent to the ends of the intermediate sheave frame. Each respective lift bracket has a large diameter cross pin 48, 49 which pivotally connects with an eye fitting on the upper end of a corresponding hydraulic lift actuator 36, 38. The rearward end portion of hoist 20 has a pair of hinge elements 31a, 32a on the underside of beams 39, 40 and which interfit with hinge elements 31, 32 on the trailer frame. These hinge elements are held together by suitable hinge pins in a well known manner. Hoist 20 may thus be raised and lowered about the axis of hinge elements 31, 32, 31a, 32a by means of hydraulic lift actuators 36, 38.

For the purpose of picking up or setting off a container, roll-off hoist 20 is provided with a cable winch 50 and a plurality of rollers 51 spaced along the outside faces of longitudinal beams 39, 40 (FIGS. 1-4). Rollers 51 are adapted to engage laterally spaced longitudinal flanges 52 of container 54 which straddle longitudinal beams 39, 40 of the hoist.

Figure 2:
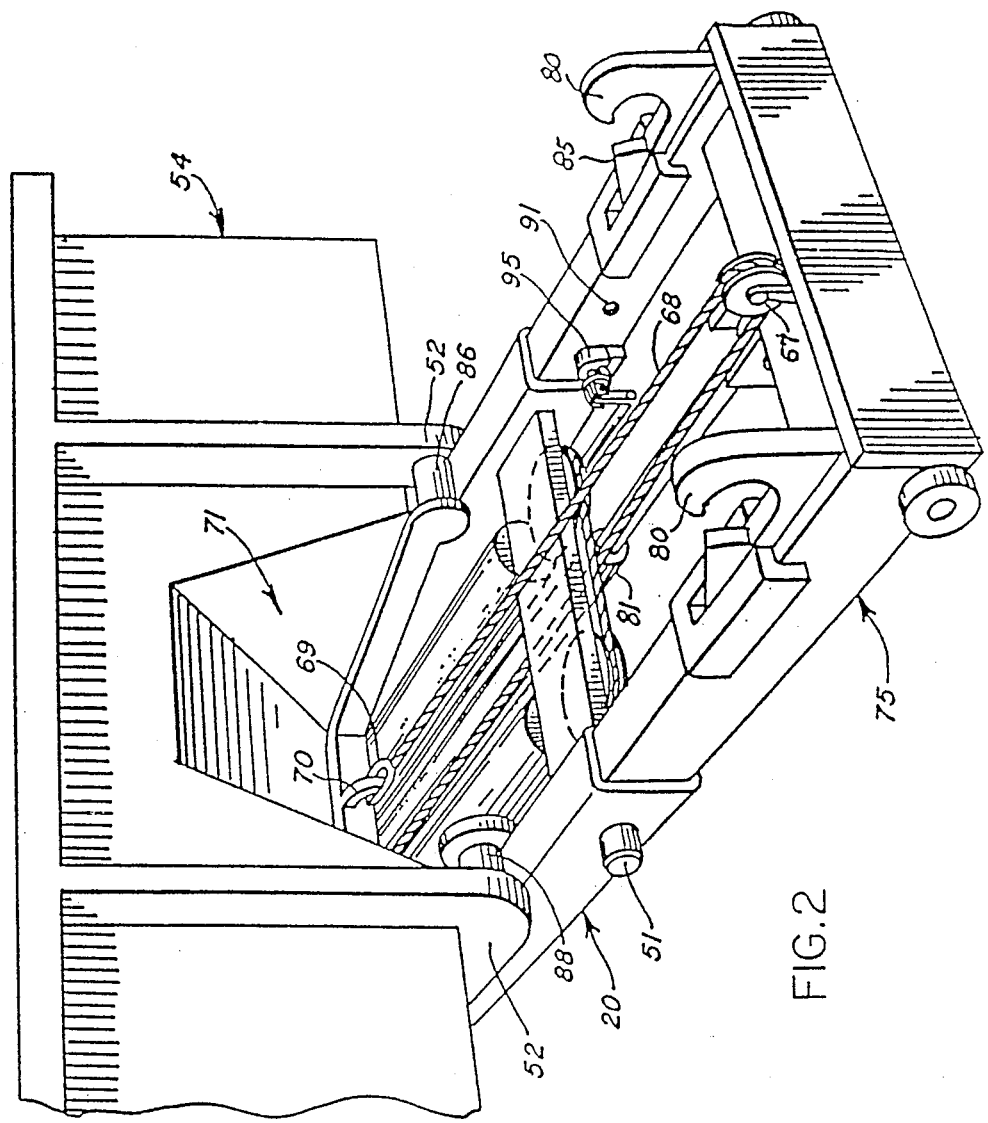
FIG. 2 is an enlarged front perspective view showing the stop carriage of the roll-off hoist of FIG. 1 about to engage a container.

Cable winch 50 comprises a pair of winch cylinders 55, 56 fixed at one end to the intermediate sheave frame 44 which supports two sheave assemblies 58, 59 (FIGS. 2, 3, 5). Cylinders 55, 56 are fixed adjacent their opposite ends to cylinder support member 42. Each cylinder 55, 56 has a piston rod 60, 61 connected to a corresponding movable sheave assembly 62, 64. The latter are arranged to move along guideways 65, 66 fixed to cross members 41 to extend or retract the loading cable 68. The free end of the cable is trained around a vertically disposed sheave 67 at the front of the stop carriage 75 and terminates in a suitable eye fitting 69. The latter is adapted for engagement with a cooperating hook 70 in a coupling recess 71 formed in the forward wall of container 54.

In order to achieve a smooth pick-up of the container, hoist 20 is provided with an extendable tail frame 72. The latter may be extended by means of hydraulic actuator 74 so as to bridge the gap from the hoist to the ground which would otherwise exist when hoist 20 is inclined for picking up or setting off a container. The tail frame also has a pair of rollers 51 journaled on each side for engagement with the longitudinal flanges 52 of container 54. Hydraulic power for operating the tail frame maY be supplied from the system pump P in any suitable manner.

In accordance with the invention, provision is made for placing a loaded container on the trailer in the most favorable position for avoiding damage to the hoist and/or trailer frame. This is accomplished in the present instance by forming roll-off hoist 20 with a variable positioning stop carriage 75 (FIGS. 1-8). Stop carriage 75 comprises a pair of laterally spaced side beams 76, 78 connected by a cross member 79 at their forward ends. Side beams 76, 78 are telescopically connected to and slidably received within longitudinal beams 39, 40 of the roll-off hoist.

Carriage 75 is positioned at various selected distances from the forward end of hoist 20 by means of fluid actuator 81 mounted on intermediate sheave frame 44. Piston rod 82 of actuator 81 is connected at its forward end to a clevis 84 projecting downwardly and rearwardly from cross member 79. Each of a pair of container stop hooks 80 mounted on carriage 75 has an associated self-locking means in the form of a spring loaded detent 85. As the cable winch draws the container forward to the stop hooks 80, detent 85 permits engagement between stop hooks 80 and container stop rollers 86, 88 but precludes disengagement of the stop rollers while the roll-off hoist is in its horizontal position. When, however, hoist 20 is tilted rearwardly, the spring pressure on detents 85 is released and the container stop rollers are then quickly disengaged from stop hooks 80 of carriage 75.

Figure 11:
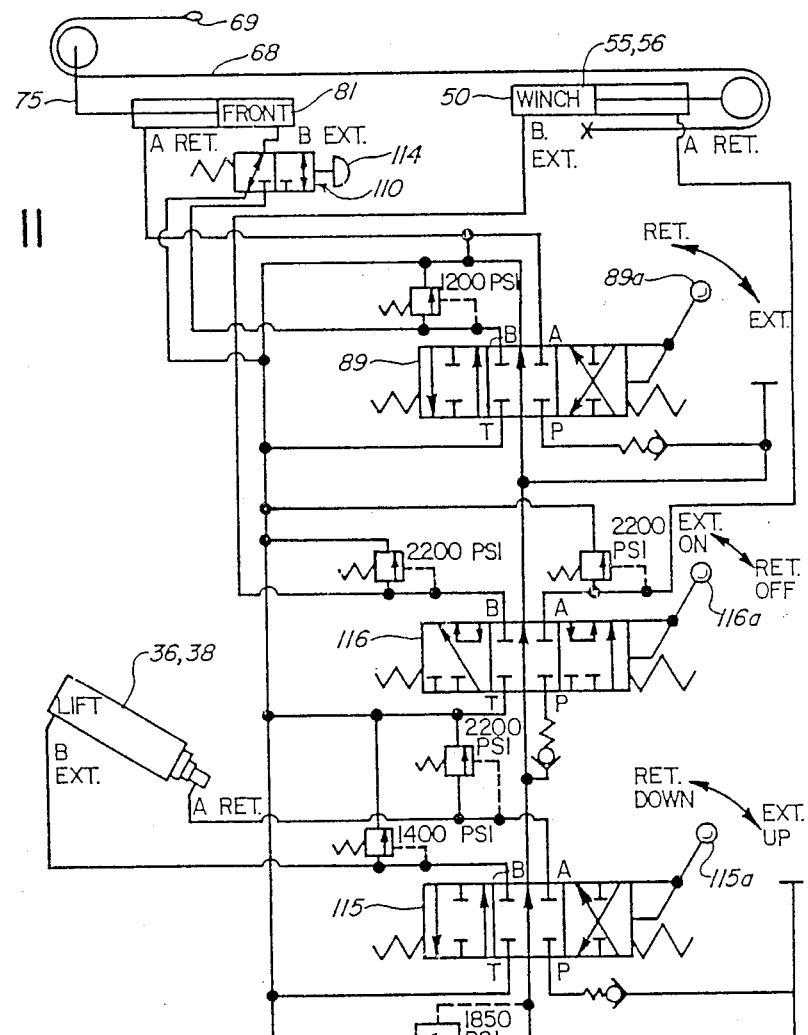
FIG. 11 is a circuit diagram of the hydraulic system of the roll-off hoist trailer illustrated in FIG. 1.
Figure 14:
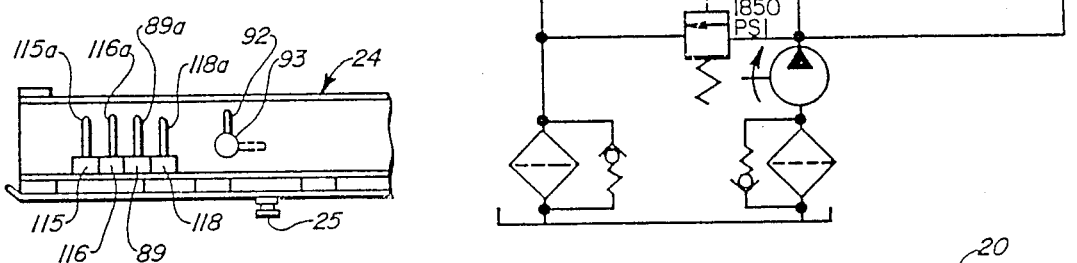
FIG. 14 is an elevational view of the controls associated with the roll-off hoist.

As indicated above, hoist 20 includes means for selectively positioning stop carriage 75 and its stop hooks 80 in a plurality of different positions of extension relative to the forward ends of hoist beams 39, 40. This is accomplished in part by means of hydraulic actuator 81 under control of RETRACT/EXTEND hydraulic valve control 89 when shifted toward the gooseneck. (FIGS. 11, 14). It is also accomplished in part by engaging shot pins 90 with the corresponding pairs of aligned apertures 91 in the carriage side beams by means of shot pin actuator 92 (FIGS. 3 and 8). The latter is controlled by the two-position air valve 93 on the gooseneck, the vertical position of the handle being the "OFF" position and the horizontal position representing "ON".

When control handle 89a of valve 89 is rocked toward the gooseneck, stop carriage 75 is extended by its hydraulic actuator 81. As it approaches the desired position for the particular container to be transported, the control handle of air valve 93 is shifted clockwise to pressurize shot pin actuator 92 and press shot pins 90 against the stop carriage beams. With further movement of the carriage, the shot pins register with the selected apertures 91 and arrest carriage 75 at the desired position.

In the present embodiment of the invention, the shot pins 90 are situated on gooseneck platform 94 of trailer 21, while the air actuating mechanism for the shot pins is situated on trailer frame 28 somewhat behind the gooseneck (FIGS. 5, 8 and 9). Each shot pin is slidably mounted in an upstanding holder 95 rigidly fixed as by welding to a respective one of the trailer frame sills 29, 30 underlying stop carriage 75. Shot pins 90 are mounted at a height which permits them to register with selected ones of the apertures 91 in side rails 76, 78. Their stroke is limited by a stop plate 96 on each holder.

Each shot pin is pivotally connected to a crank arm 98 or 99 fixed to a horizontal shaft 100, 101 journaled just above the gooseneck platform (FIGS. 8, 9). The rearward end of each shaft 100, 101 has a depending crank arm 102, 104. Arms 102, 104 are pivotally connected as by links 105, 106 to a horizontally disposed torque arm 108. The latter is also pivotally connected at one end to a piston rod 109 of shot pin actuator 92. Actuator 92 is pivotally attached at its opposite end to the trailer frame.

Once the container has been loaded upon hoist 20 and engaged by stop members 80, 86, 88, it is also brought into engagement with hold-down brackets 119 (FIGS. 3, 4). These brackets are located on each side of the hoist in the vicinity of wheeled suspension 22. Brackets 119 are of inverted L-shaped cross section and slidably engage pins or rollers (not shown) projecting outwardly from the longitudinal flanges of the container. This holds the container on the hoist during transport.

Provision is made for precluding extension of stop carriage 75 from its retracted position unless hoist 20 is in its completely lowered position. This is accomplished by means of a hydraulic interlock selector valve 110 located on the trailer frame a short distance to the rear of thrust brackets 34 (FIGS. 10, 11). Interlock selector valve 110 includes in this instance an actuating spool 111 operated by bell crank 112 and plunger 114. Plunger 114, in turn, is actuated by the raising and lowering of hoist 20 on trailer 21.

When hoist 20 is in its completely lowered, horizontal position on trailer 21, plunger 114 of interlock valve 110 is depressed. This shifts the spool of valve 110 to the left (as shown in FIG. 11) and aligns its through-passage with the B connection on fluid actuator 81 of stop carriage 75. When under this condition, handle 89a of control valve 89 may be rocked toward the gooseneck to the "EXTEND" position, whereby actuator 81 receives pressure fluid from the pump line and moves stop carriage 75 forward toward a predetermined position to define the location of a container on the hoist. As carriage 75 approaches such position, control handle 92 of the air valve 93 is rotated clockwise to press the shot pins against the stop carriage beams. As soon as the pins register with the selected apertures for the desired carriage position, the shot pins engage the carriage beams and lock the carriage in place.

To pick up or set off a container by means of hoist 20, cable winch 50 must be energized. This is done by shifting handle 116a of hydraulic valve control 116 toward and away from the gooseneck, thereby pressurizing or draining the winch cylinders 55, 56 as necessary to extend or retract cable 68 (FIGS. 11, 14).

Prior to picking up or setting off a container, extendable tail frame 72 must be extended as previously noted. Extension and withdrawal of frame 72 is effected by means of hydraulic actuator 74 under valve control 118a, 118 on the gooseneck. Shifting control handle 118a toward the gooseneck extends frame 72, while shifting the control handle in the opposite direction retracts it.

With the foregoing description in mind, the modes of operation of the roll-off hoist 20 will now be set forth. Assuming that an outside rail type container 54 resting on the ground is to be loaded on trailer 21, the basic loading steps would be as follows:

1. Align tractor, trailer with hoist, and container, in a straight line (do not jackknife tractor).
2. Release shot pins 90 locking stop carriage 75, using control valve 93. (Note: Stop carriage 75 must be in retracted position at all times unless attached to a container. Never extend carriage 75 without the cable being attached to a container.)
3. Set trailer brakes, raise hoist by moving handle 115a of control valve 115 toward the gooseneck 24, and hook cable to container.
4. Release trailer brakes and pull container onto hoist allowing trailer to roll back under container.
5. Pull container forward until container front roller stops 86, 88 are engaged into fixed front stops 80 of the hoist.
6. Set trailer brakes.
7. Lower hoist by moving hoist "down control" handle 115a of control valve 115 away from the gooseneck. (Note: always power down lift cylinders 36, 38; do not allow gravity to lower hoist.)

Stop carriage 75, as noted above, cannot be extended unless the hoist is in a completely lowered position. Its operation is as follows:

1. Using stop carriage control valve 89, 89a and winch control valve 116, 116a together, the stop carriage may be moved forward into any one of 7 distinct positions.
2. Shot pins 90 may be engaged in any selected position by means of air control valve 93 and handle 92.
3. Cable may be tightened by winch control 116, 116a if it becomes slack or if the container did not move forward with the stop carriage.

For dumping a load, the steps are as follows:

1. Set trailer brakes.
2. Release shot pins 90 from stop carriage 75.
3. Retract stop carriage.
4. Raise hoist and dump load.
5. Lower hoist and secure empty container as explained in the "LOADING CONTAINER" instructions.

The container may be unloaded from the hoist as follows:

1. Set trailer brakes.
2. Release shot pins from stop carriage 75.
3. Retract stop carriage.
4. Raise hoist by means of control 115, 155a and winch container to the ground by means of control 116, 116a.
5. Release trailer brakes, allowing trailer to be pushed out from under the container.

Figure 12:
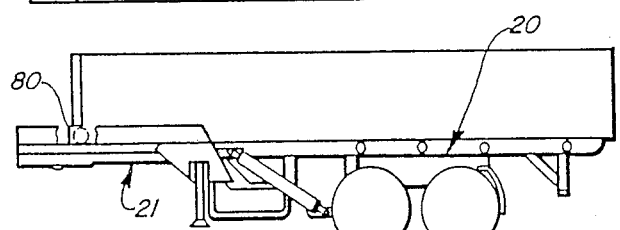
FIGS. 12 and 13 are diagrammatic views illustrating the positioning of a long container and a short container, respectively, on the roll-off hoist trailer of FIG. 1.
Figure 13:
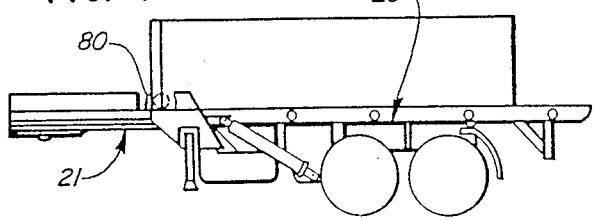

Turning next to FIGS. 12 and 13, the optimum loading of large containers, 30 foot length, for example, and small containers, 20 foot length, for example, on the roll-off hoist trailer 21 is shown diagrammatically. It will of course be understood that containers between these two sizes may also be handled. To accommodate this range of sizes, stop carriage 75 in this instance has a maximum travel of 79 inches. Stop carriage positions are available from the front of hoist 20 at 26 inches, then 18 inches, and then five more each spaced 12 inches from the next one. By reason of the foregoing, hoist 20 is able to locate each individual container on the transport vehicle with its center of gravity in the most favorable position for protecting the structure of the vehicle.

Referring next to FIGS. 15 and 16, there is shown still another embodiment of the present invention in the form of an inside/outside roll-off hoist 120 with a movable stop carriage 175. In this instance, an inside rail container 154 has been loaded on hoist 120 and is being drawn by the cable winch cylinders 55, 56 toward movable stop carriage 175. The cable 168 is connected to the hook of the container by means of an elongated eye fitting 169. This particular container, known commercially as a DEMPSTER DINO container, has a loading hook 170 mounted on a short, angular box-like extension 171 projecting forwardly from the front of the container rather than being housed in a coupling recess behind the front of the container.

To avoid drawing cable eye 169 into front sheave 167 on stop carriage 175, the latter is provided with an auxiliary stop in the form of a hinged bar 176 having a generally T-shaped stop abutment 177 on its projecting end. Bar 176, also known as a "pusher bar" is mounted on a pivot pin 178 between a pair of laterally spaced hinge plates 179 situated above front sheave 167. It may be secured in upstanding position, or in generally horizontal position, by means of a two-position locking pin 183. When hoist 120 is used with recessed hook containers, pusher bar 176, 177 is normally locked in an upstanding or disengaged position by placing locking pin 183 in the lower pair of holes 184 (FIG. 15). The pusher bar is lowered to a generally horizontal position for engagement with the hook of a DEMPSTER DINO or similar container having a non-recessed hook. It is locked in this position by placing locking pin 183 in the upper pair of holes 185 (FIG. 16). For operating with this type of container, stop carriage 175 is maintained in the second position from its most forward position.

Movable stop carriage 175 may also be used to start the unloading process for an overloaded container or one having excessive friction between the container sills and the hoist. In this instance, pusher bar 176, 177 engages the container hook and serves to start the container moving rearwardly.

In addition to pusher bar 176, 177, roll-off hoist 120 is provided with a pair of fixed stops 187 (FIG. 15). These stops are mounted on the winch sheave assembly 158, 159 of the hoist and each is spaced laterally a slight distance from the hoist side rail. Each stop 187 is adapted to abuttingly engage the forward end of a rib 188 welded to the inside face of a container sill. Each stop is also formed with a hold-down bracket which overlies and engages the forward portion of the rib 188. The spacing of stop 187 and pusher bar 176, 177 is such that both engage container 154 at the same time when used as described below.

For the purpose of preventing cable eye 169 from slipping off container hook 170, a resilient retainer strap 189 is utilized (FIGS. 15–17). the ends of the strap have holes 190 designed to engage a pair of fasteners such as pins 191 on opposite sides of the cable eye. The medial portion of the strap is extended through a tubular holder 192 with a U-shaped handle 193. After the ends of the strap have been engaged with cable eye pins 191, the holder is grasped manually, stretching strap 189 and permitting it to be inserted in a recess at the top of container hook 170.

The modes of operation of roll-off hoist 120 with the inside rail type container known as the DEMPSTER DINO container will now be addressed. Starting with loading the container on the hoist, the steps involved are as follows:
1. Lower pusher bar 176, 177 by removing locking pin 183 from lower hole. Fold pusher bar down and install pin 183 into upper hole. (Note: Failure to lower the pusher bar can allow the cable hook to be pulled into the front sheave causing damage or failure to one or both.)
2. Align trailer with container.
3. Set trailer brakes, raise hoist by means of control 115, 115a and attach cable to container front hook. Attach the cable eye retaining rubber strap onto the container front hook to prevent cable eye 169 from becoming disengaged from the container.
4. Release trailer brakes and pull container onto hoist with winch control 116, 116a, allowing trailer to roll back under container.
5. Pull container forward with winch until container front hook 170 engages the pusher bar.
6. Set trailer brakes.
7. Lower hoist, using control 115, 115a.

Movable stop carriage 175 may be operated after the manner of stop carriage 75 described above. The steps are as follows:
1. Using the two controls 89, 89a and 116, 116a together, move stop carriage 175 forward to the 6th position (next to forwardmost position).
2. Engage movable shot pins 90 to lock stop carriage.
3. Use hoist "winch on" control 116, 116a to tighten cable if it becomes loose or if the container did not move forward with stop carriage. (Note: Container stops 188 must be engaged with hoist stops 187 when the stop carriage is locked in next to forwardmost position).
4. Release trailer brakes.

An alternate method of operating stop carriage 175 may be used if, for some reason, the container cannot be moved forward by using the controls 89, 89a and 116, 116a together. This method is more powerful because it uses the power of the winch cylinders to move the container in lieu of the small cylinder that powers the stop carriage. The steps are:
A1. Using "Winch Off" control, retract winch cylinders for approximately 1 minute (longer time if stop carriage does not extend to desired length; trailer must not be moved until cable is tightened--See A2 below).
A2. Use stop carriage forward controls, 89, 89a and 116, 116a and extend stop carriage until the locking shot pins can be engaged into the 6th (next to the forwardmost) position (at marked point).
A3. Engage shot pins to lock stop carriage in A2 position.
A4. Use "Winch On" control and pull container forward until it engages the pusher bar and the container stops.

The procedure for dumping the load of the inside rail container 154 on hoist 120 is as follows:
1. Set trailer brakes.
2. Release front locking or shot pins.
3. Retract stop carriage using control 89, 89a.
4. Raise hoist and dump load. (Note: Do not attempt to raise hoist without first retracting stop carriage completely because cylinder that operates carriage does not have sufficient power to keep container from sliding backward).
5. Lower hoist and secure empty container as explained in the "LOADING CONTAINER" instructions. This must be performed to engage the container stops.

In order to unload the inside rail type container, the instructions for dumping the load should be followed, but with the addition of the following steps:
1. Winch container to ground using "Winch Off" controls.
2. Release trailer brakes allowing trailer to be pushed out from under the container. (Note: If the next use of the hoist is an outside rail type container, raise the pusher bar by reversing Item number 1 in the foregoing paragraph presenting "unloading container" instructions).

What is claimed is:
1. A vehicle mounted roll-off hoist for loading, transporting and unloading containers of various sizes, each container having container stop means and cable hitch means at its forward end, said hoist comprising:
   a roll-off hoist frame hingedly connected at its rearward end to a vehicle to pivot between a horizontal transport position and a rearwardly inclined load- ing position, said hoist frame adapted to receive a container directly atop and adjacent thereto;

a container stop carriage slidably mounted to said hoist frame forwardly of the rearward end, said carriage adapted for extension forwardly of said hoist frame and for retraction therefrom;

carriage stop means mounted on said stop carriage for engagement with coacting container stop means on a container;

a cable winch apparatus operable with said hoist frame and adapted to pull a container onto said hoist frame;

actuator means interposed between said stop carriage and said hoist frame for moving said stop carriage and a container connected thereto forwardly of said hoist frame; and wherein said container stop carriage is mounted entirely forwardly of the rearward end of said hoist frame and is not extendable rearwardly of the rearward end of said hoist frame.

2. The vehicle mounted roll-off hoist of claim 1 wherein said stop carriage includes a sheave member and wherein said winch apparatus includes a cable anchored at one end to said hoist frame, threaded around said sheave member and extending rearwardly therefrom for connection to a container to pull the container toward said sheave member.

3. The vehicle mounted roll-off hoist of claim 1 wherein said cable winch apparatus is anchored to said hoist frame.

* * * * *